United States Patent
Sivanesan et al.

(10) Patent No.: US 9,974,099 B2
(45) Date of Patent: May 15, 2018

(54) RADIO LINK MONITORING

(71) Applicant: Intel Corporation, Santa Clara, CA (US)

(72) Inventors: Kathiravetpillai Sivanesan, Portland, OR (US); Ali Taha Koc, Portland, OR (US); Satish C. Jha, Hillsboro, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 434 days.

(21) Appl. No.: 14/498,993

(22) Filed: Sep. 26, 2014

(65) Prior Publication Data

US 2015/0146562 A1 May 28, 2015

Related U.S. Application Data

(60) Provisional application No. 61/909,938, filed on Nov. 27, 2013.

(51) Int. Cl.
*H04W 74/04* (2009.01)
*H04L 5/00* (2006.01)
(Continued)

(52) U.S. Cl.
CPC .......... *H04W 74/04* (2013.01); *H04B 7/2621* (2013.01); *H04L 1/0026* (2013.01);
(Continued)

(58) Field of Classification Search
CPC . H04W 24/00; H04W 74/04; H04W 72/0446; H04W 72/02; H04W 72/048;
(Continued)

(56) References Cited

U.S. PATENT DOCUMENTS 9,042,315 B2 * 5/2015 Lin ................. H04W 36/30
370/242
9,210,675 B2 * 12/2015 Dinan ............. H04W 56/0005
(Continued)

FOREIGN PATENT DOCUMENTS

RU 02390972 5/2010
WO 2008020280 A1 2/2008
(Continued)

OTHER PUBLICATIONS

3GPP, "Evolved Universal Terrestrial Radio Access (E-UTRA); Requirements for support of radio resource management (Release 12)," 3GPP TS 36.133 V12.1.0 (Sep. 2013), Section 7.6, Sep. 27, 2013, 32 pages.
(Continued)

*Primary Examiner* — Christine Ng
(74) *Attorney, Agent, or Firm* — Schwabe, Williamson & Wyatt, P.C.

(57) ABSTRACT

In embodiments, apparatuses, methods, and storage media may be described for monitoring channel quality of a radio link between a secondary evolved NodeB (SeNB) and a user equipment (UE) in a wireless communication network configured for dual connectivity. In embodiments, the UE may generate one or more indications of a channel quality of the SeNB-UE radio link and forward the indication to the SeNB. Based on the indication, the UE may receive a radio resource control (RRC) message from a master eNB (MeNB) related to the SeNB-UE radio link. Other embodiments may be claimed.

19 Claims, 6 Drawing Sheets

(51) Int. Cl.

| | |
|---|---|
| *H04L 5/14* | (2006.01) |
| *H04W 72/04* | (2009.01) |
| *H04W 52/02* | (2009.01) |
| *H04W 76/04* | (2009.01) |
| *H04L 1/18* | (2006.01) |
| *H04L 29/08* | (2006.01) |
| *H04W 40/30* | (2009.01) |
| *H04L 12/825* | (2013.01) |
| *H04W 28/02* | (2009.01) |
| *H04W 16/14* | (2009.01) |
| *H04B 7/26* | (2006.01) |
| *H04L 27/26* | (2006.01) |
| *H04W 72/02* | (2009.01) |
| *H04L 1/00* | (2006.01) |
| *H04W 88/06* | (2009.01) |
| *H04W 88/10* | (2009.01) |
| *H04W 36/00* | (2009.01) |
| *H04W 84/12* | (2009.01) |

(52) U.S. Cl.
CPC .......... *H04L 1/1825* (2013.01); *H04L 5/0007* (2013.01); *H04L 5/0032* (2013.01); *H04L 5/0051* (2013.01); *H04L 5/0073* (2013.01); *H04L 5/14* (2013.01); *H04L 27/2607* (2013.01); *H04L 47/25* (2013.01); *H04L 69/324* (2013.01); *H04W 16/14* (2013.01); *H04W 28/0205* (2013.01); *H04W 40/30* (2013.01); *H04W 52/0216* (2013.01); *H04W 52/0254* (2013.01); *H04W 72/02* (2013.01); *H04W 72/042* (2013.01); *H04W 72/048* (2013.01); *H04W 72/0413* (2013.01); *H04W 72/0446* (2013.01); *H04W 72/0453* (2013.01); *H04W 76/046* (2013.01); *H04W 76/048* (2013.01); *H04W 36/0083* (2013.01); *H04W 84/12* (2013.01); *H04W 88/06* (2013.01); *H04W 88/10* (2013.01); *Y02B 60/50* (2013.01)

(58) Field of Classification Search
CPC .... H04W 84/12; H04L 5/0057; H04L 1/0026; H04L 5/0032
See application file for complete search history.

(56) References Cited

U.S. PATENT DOCUMENTS

| | | | | |
|---|---|---|---|---|
| 9,258,809 | B2* | 2/2016 | Liao | H04W 36/08 |
| 2003/0096618 | A1* | 5/2003 | Palenius | H04W 24/00 455/453 |
| 2004/0037327 | A1 | 2/2004 | Torsner et al. | |
| 2012/0014468 | A1* | 1/2012 | Wu | H04B 7/024 375/260 |
| 2012/0213108 | A1 | 8/2012 | Ji et al. | |
| 2013/0083675 | A1* | 4/2013 | Yamada | H04W 24/08 370/252 |
| 2013/0250881 | A1* | 9/2013 | Liao | H04W 36/08 370/329 |
| 2014/0120919 | A1* | 5/2014 | Birdi | H04W 36/0055 455/437 |
| 2014/0355562 | A1* | 12/2014 | Gao | H04W 76/025 370/331 |

FOREIGN PATENT DOCUMENTS

| | | | |
|---|---|---|---|
| WO | WO 2012/139798 A1 | 10/2012 | |
| WO | 2012149898 A1 | 11/2012 | |
| WO | WO 2013/104413 A1 | 7/2013 | |
| WO | WO 2013171576 A1 * | 11/2013 | ........ H04W 36/0094 |

OTHER PUBLICATIONS

3GPP, "Evolved Universal Terrestrial Radio Access (E-UTRA); Study on Small Cell Enhancements for E-UTRA and E-UTRAN—Higher layer aspects (Release 12),"3GPP TR 36.842 V1.0.0 (Nov. 2013), Nov. 26, 2013, Lte Advanced, 68 pages.
3GPP, "Scenarios and requirements for small cell enhancements for E-UTRA and E-UTRAN (Release 12)," 3GPP TR 36.932 V12.1.0 (Mar. 2013), Mar. 18, 2013, 14 pages.
3GPP, "Evolved Universal Terrestrial Radio Access (E-UTRA); Radio Resource Control (RRC); Protocol specification (Release 11)," 3GPP TS 36.331 V11.5.0 (Sep. 2013), Sep. 19, 2013, 347 pages.
Intel Corporation, "Radio link failure handling for dual connectivity," 3GPP TSG RAN WG2 Meeting #83 R2-132819, Agenda item: 7.2.3, Aug. 19-23, 2013, Barcelona, Spain, 4 pages.
International Search Report and Written Opinion dated Feb. 11, 2015 from International Application No. PCT/US2014/065072.
Korean Notice of Preliminary Rejection for Patent Application No. 10-2016-7010395 dated Jan. 23, 2017; 11 pages.
Russian Office Action for Patent Application No. 2016116705 dated Mar. 2, 2017; 10 pages.
Intel Corporation; "Radio link failure handling for dual connectivity," 3GPP TSG RAN WG2 Meeting #84, R2-134271, Agenda Item: 7.2.3; San Francisco, USA, Nov. 11-15, 2013; 4 pages.
CATT, CATR; "RLM considerations for dual connectivity," 3GPP TSG RAN WG2 Meeting #84, R2- 134053, Agenda Item: 7.2.3; San Francisco, USA, Nov. 11-Nov. 15, 2013; 4 pages.
European Patent Office; Extended European Search Report issued for Patent Application No. 14866014.5 dated Jul. 18, 2017; 9 pages.
Japan Patent Office; Office Action issued for Patent Application No. 2016-526111 dated Jun. 20, 2017; 8 pages.
Australian Government; Office Action issued for Patent Application No. 2014355109 dated Feb. 7, 2017; 5 pages.
Article 94(3) dated Mar. 15, 2018 from European Patent Application No. 14866014.5, 5 pages.

* cited by examiner

RADIO LINK MONITORING

CROSS REFERENCE TO RELATED APPLICATION

The present application claims priority to U.S. Provisional Patent Application No. 61/909,938, filed Nov. 27, 2013, entitled "Advanced Wireless Communication Systems and Techniques," the entire disclosure of which is hereby incorporated by reference in its entirety.

FIELD

Embodiments of the present invention relate generally to the technical field of radio link monitoring in dual-connectivity networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

A dual-connectivity network may be a network where a user equipment (UE) can connect with more than one cell site simultaneously. A cell site may be considered to be an evolved NodeB (eNB). When a UE connects to two (or more) eNBs, it may receive data from both eNBs at the same time. In embodiments, one of the eNBs may be considered a Master eNB (MeNB), which may have a radio resource control (RRC) entity. Another of the eNBs may be considered a Secondary eNB (SeNB), which may not have an RRC entity. The UE may be connected with the MeNB over an MeNB-UE radio link, and the UE may be connected with the SeNB over an SeNB-UE radio link. In some cases, the UE may not be configured to monitor the quality of the SeNB-UE radio link.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
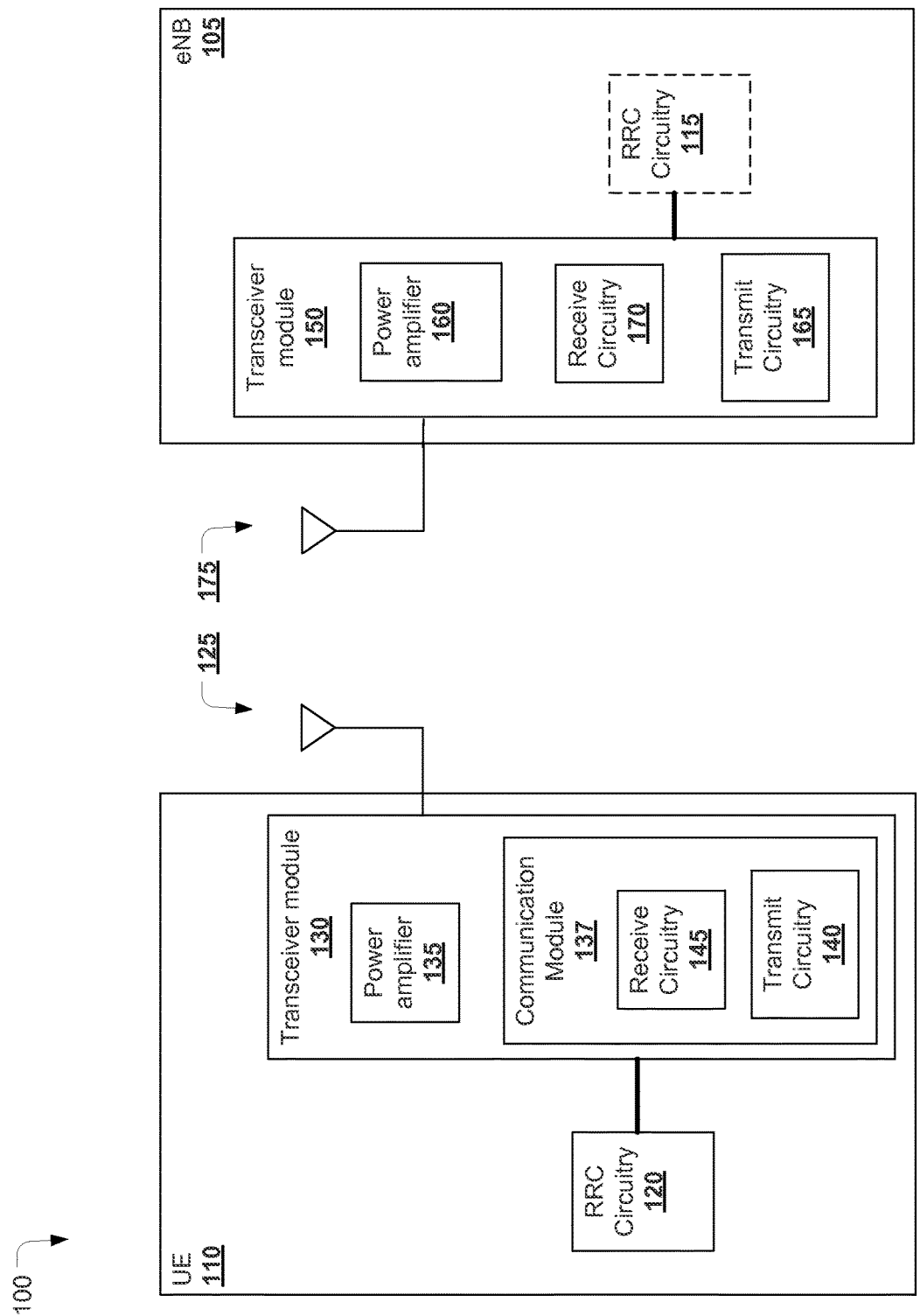
FIG. 1 schematically illustrates a high-level example of a network comprising a UE and an eNB, in accordance with various embodiments.

In embodiments, apparatuses, methods, and storage media may be described for monitoring channel quality of a radio link between an SeNB and a UE in a wireless communication network configured for dual connectivity. In embodiments, the UE may generate one or more indications of a channel quality of the SeNB-UE radio link and forward the indication to the SeNB. Based on the indication, the UE may receive an RRC message from an MeNB related to the SeNB-UE radio link.

In embodiments, the indications may be based on one or more radio link monitoring (RLM) parameters related to the SeNB-UE radio link. In some embodiments, the RLM parameters related to the SeNB-UE radio link may be different than RLM parameters related to the MeNB-UE radio link. In some embodiments, the indications may be related to one or more channel quality indicator CQI values measured by the UE. In some embodiments, the CQI values may be reported to the SeNB that may compare the CQI values to a channel quality threshold. In some embodiments, the SeNB may transmit an indication of the result of the comparison to the MeNB. In other embodiments, the SeNB may forward the CQI values to the MeNB which may perform the comparison of the CQI values to the channel quality threshold.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As discussed herein, the term "module" may be used to refer to one or more physical or logical components or elements of a system. In some embodiments a module may be a distinct circuit, while in other embodiments a module may include a plurality of circuits.

FIG. 1 schematically illustrates a wireless communication network 100 (hereinafter "network 100") in accordance with various embodiments. The network 100 may include a UE 110 that is communicatively coupled with an eNB 105. In embodiments, the network 100 may be a third generation partnership project (3GPP) Long Term Evolution (LTE), LTE Advanced (LTE-A) and/or LTE-Unlicensed (LTE-U) network. In other embodiments, the network 100 may be some other type of wireless communication network.

As shown in FIG. 1, the UE 110 may include a transceiver module 130, which may also be referred to as a multi-mode transceiver chip. The transceiver module 130 may be configured to transmit and receive signals using one or more protocols such as LTE, LTE-A, and/or LTE-U protocols. Specifically, the transceiver module 130 may be coupled with one or more of a plurality of antennas 125 of the UE 110 for communicating wirelessly with other components of the network 100, e.g., eNB 105 or another UE. The antennas 125 may be powered by a power amplifier 135 which may be a component of the transceiver module 130 as shown in FIG. 1, or separate from but coupled with the transceiver module 130. In one embodiment, the power amplifier 135 may provide the power for all transmissions on the antennas 125. In other embodiments, there may be multiple power amplifiers on the UE 110. The use of multiple antennas 125 may allow for the UE 110 to use transmit diversity techniques such as spatial orthogonal resource transmit diversity (SORTD), multiple-input multiple-output (MIMO), or full-dimension MIMO (FD-MIMO).

In certain embodiments the transceiver module 130 may include a communication module 137, which may be referred to as a broadband module, which may contain both transmit circuitry 140 configured to cause the antennas 125 to transmit one or more signals from the UE 110, and receive circuitry 145 configured to process signals received by the antennas 125. In other embodiments, the communication module 137 may be implemented in separate chips or modules, for example, one chip including the receive circuitry 145 and another chip including the transmit circuitry 140. In some embodiments, the transmitted or received signals may be cellular signals transmitted to or received from eNB 105. In some embodiments, the transceiver module 130 may include or be coupled with an RRC circuitry 120 to identify, generate, or interpret one or more RRC signals, RLM parameters, or channel quality parameters, as described in further detail below.

Similar to the UE 110, the eNB 105 may include a transceiver module 150. The transceiver module 150 may be further coupled with one or more of a plurality of antennas 175 of the eNB 105 for communicating wirelessly with other components of the network 100, e.g., UE 110. The antennas 175 may be powered by a power amplifier 160 which may be a component of the transceiver module 150, as shown in FIG. 1, or may be a separate component of the eNB 105. In one embodiment, the power amplifier 160 may provide the power for all transmissions on the antennas 175. In other embodiments, there may be multiple power amplifiers on the eNB 105. The use of multiple antennas 175 may allow for the eNB 105 to use transmit diversity techniques such as SORTD, MIMO, or FD-MIMO. In certain embodiments the transceiver module 150 may contain both transmit circuitry 165 configured to cause the antennas 175 to transmit one or more signals from the eNB 105, and receive circuitry 170 to process signals received by the antennas 175. In other embodiments, the transceiver module 150 may be replaced by transmit circuitry 165 and receive circuitry 170 which are separate from one another (not shown). In some embodiments, though not shown, the transceiver module 150 may include a communication module such as communication module 137 that includes the receive circuitry 170 and the transmit circuitry 165. In some embodiments, the eNB 105 may include RRC circuitry 115, which may be similar to RRC circuitry 120. For example, if the eNB 105 is an MeNB, the eNB 105 may include the RRC circuitry 115. In other embodiments, for example, if the eNB 105 is an SeNB, the eNB 105 may not include the RRC circuitry 115.

Figure 2:
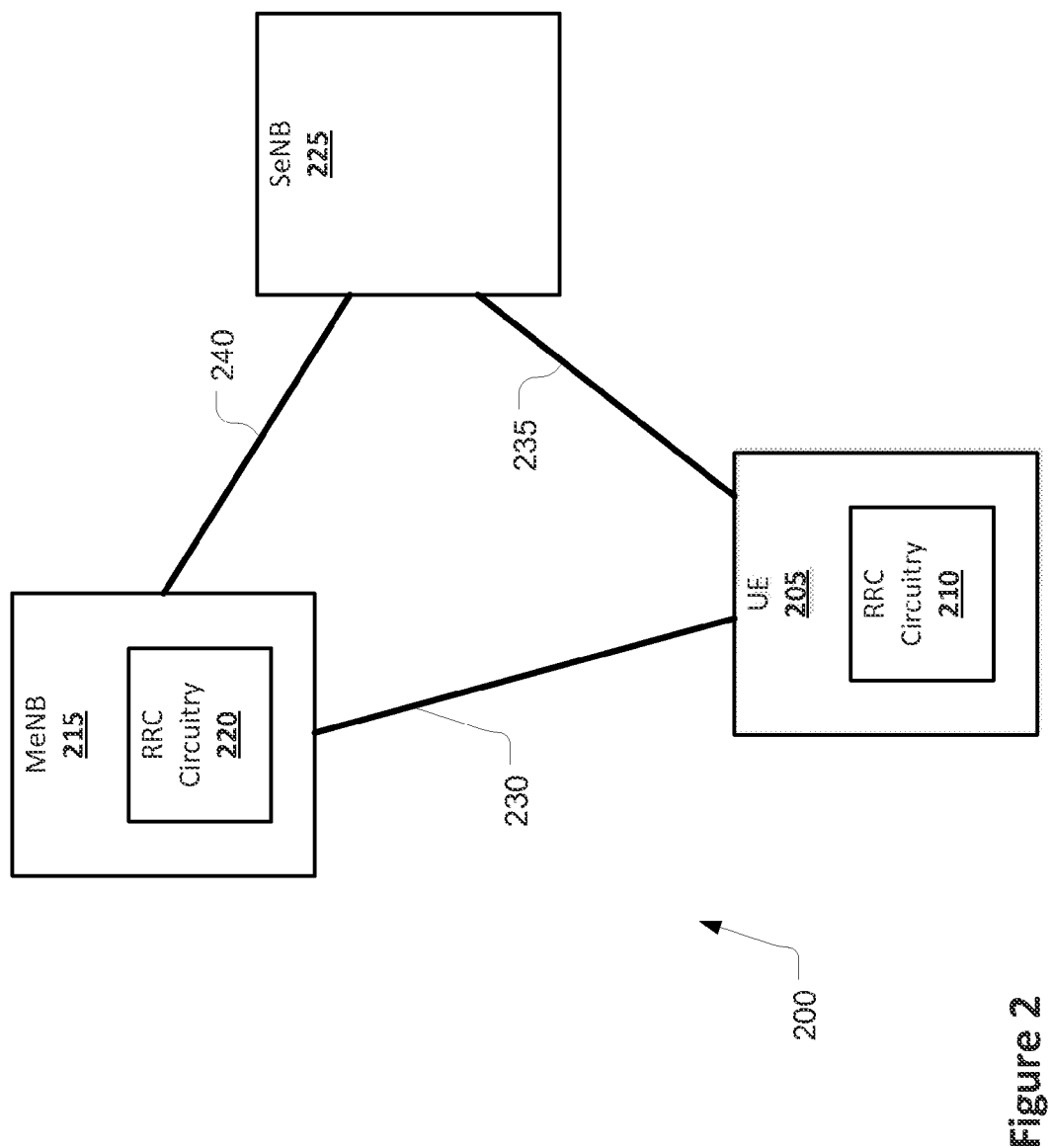
FIG. 2 schematically illustrates a high-level example of a network comprising a UE, an SeNB, and an MeNB, in accordance with various embodiments.

FIG. 2 depicts an example of a network 200 that may be similar to network 100 and include a UE 205 with RRC circuitry 210, which may be similar to UE 110 and RRC circuitry 120. The UE 205 may be communicatively coupled with an MeNB 215 with RRC circuitry 220, which may be similar to eNB 105 and RRC circuitry 115. Specifically, the UE 205 and MeNB 215 may be coupled via radio link 230, which may be a Uu radio link or radio bearer. Radio link 230 may be referred to as the MeNB-UE radio link. The UE 205 may be further coupled with an SeNB 225, which may also be similar to eNB 105. The UE 205 may be coupled with the SeNB 225 via a radio link 235 which may be a Uu radio link or radio bearer. Radio link 235 may be referred to as the SeNB-UE radio link. The SeNB 225 and MeNB 215 may be coupled via a radio link 240 which may be an X2 radio link or radio bearer. Radio link 240 may be referred to as the MeNB-SeNB radio link.

As described above, in some cases one or both of the UE 205 or MeNB 215 may be configured to monitor the quality of the MeNB-UE radio link 230. However, in legacy networks, there may not be a mechanism in place to monitor the quality of the SeNB-UE radio link 235. In embodiments of the network 200 herein, the SeNB 225 may be configured to, based on channel quality indicator (CQI) values reported to the SeNB 225 by the UE 205, monitor the quality of the SeNB-UE radio link 235. Specifically, the SeNB 225 may be configured to receive the CQI values from the UE 205 and compare the reported values to a channel quality threshold. If the CQI values do not meet the channel quality threshold, then the SeNB 225 may transmit an indication to the MeNB 215, and particularly the RRC circuitry 220 of the MeNB 215, over the MeNB-SeNB radio link 240 that the SeNB-UE radio link 235 may be poor or low quality.

Figure 3:
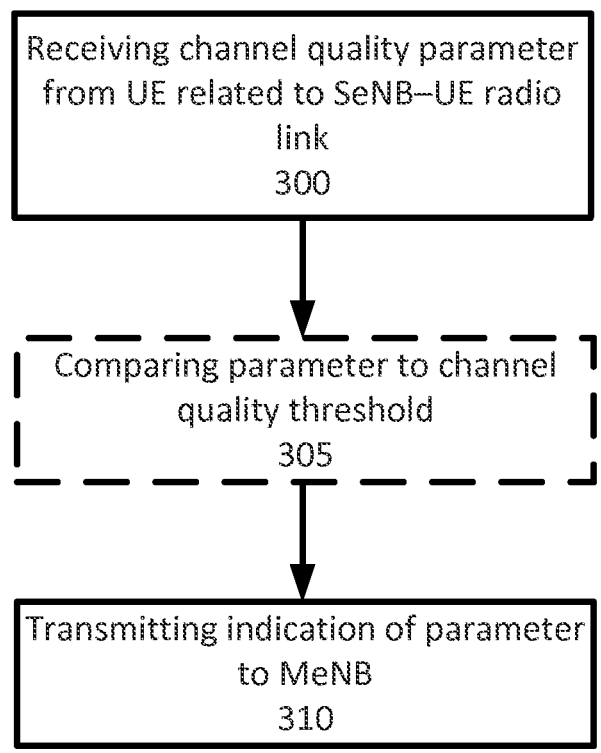
FIG. 3 depicts a process for monitoring the SeNB-UE radio link that may be performed by an SeNB, in accordance with various embodiments.

FIG. 3 depicts a process that may be performed by the SeNB 225 to monitor the channel quality of the SeNB-UE radio link 235. Initially, the SeNB 225 may receive a channel quality parameter from the UE 205 at 300. The channel quality parameter may be related to the SeNB-UE radio link 235. The channel quality parameter may be, for example, one or more CQI values measured by the UE 205. In some embodiments, the channel quality parameter may be an indication from the UE 205 that the channel quality of the SeNB-UE radio link 235 is poor, as will be described in greater detail below.

In some embodiments, the SeNB 225 may optionally compare the received channel quality parameter to a channel quality threshold at 305. Specifically, if the received channel quality parameter is a CQI value, then the SeNB 225 may compare the received CQI value to the channel quality threshold. If the CQI value is below the channel quality threshold, then the SeNB 225 may identify that the channel quality of the SeNB-UE radio link 235 is poor.

The SeNB 225 may then transmit an indication of the channel quality parameter to the MeNB 215, and specifically the RRC circuitry 220 of the MeNB 215, at 310. In some embodiments the indication may be the CQI value itself. In some embodiments, the indication may be a result of the identification by the SeNB 225 that the channel quality of the SeNB-UE radio link 235 is poor based on the comparison of the CQI value with the threshold. In some embodiments, the indication may be the indication from the UE 205 that the channel quality of the SeNB-UE radio link 235 is poor, as will be described in greater detail below. For example, the indication may be related to one or more random access channel (RACH) processes initiated by the UE 205.

In some embodiments, the MeNB 215, and particularly the RRC circuitry 220 of the MeNB 215, may be configured to identify that the SeNB-UE radio link 235 is relatively low or poor quality. Specifically, the MeNB 215 may receive, from the SeNB 225, one or more CQI values related to the SeNB-UE radio link 235, and compare the received CQI values to a channel quality threshold. If the received CQI values are below the channel quality threshold, then the MeNB 215, and particularly the RRC circuitry 220, may identify that the SeNB-UE radio link 235 is relatively low or poor quality. In some embodiments, the received downlink (DL) CQI values may be shared between the MeNB 215 and the SeNB 225 via an X2 interface.

Figure 4:
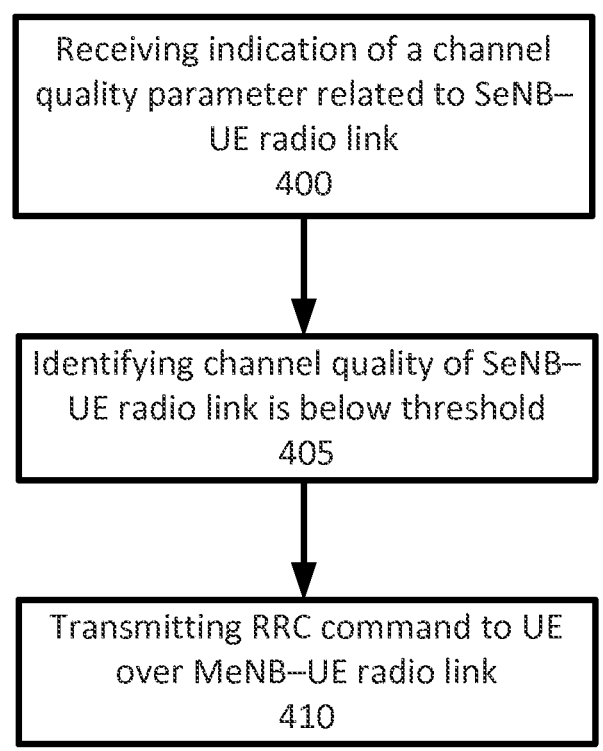
FIG. 4 depicts a process for monitoring the SeNB-UE radio link that may be performed by an MeNB, in accordance with various embodiments.

FIG. 4 depicts a process that may be performed by an MeNB such as MeNB 215, and particularly the RRC circuitry 220 of the MeNB 215. As described below, the process will be generally described with respect to the MeNB 215, though in embodiments the RRC circuitry 220 or some other processor of circuitry of the MeNB 215 may perform one or more elements of the process of FIG. 4.

Initially, the MeNB 215 may receive at 400 an indication of a channel quality parameter related to the SeNB-UE radio link 235. In embodiments, the indication may be received from the SeNB 225. In some embodiments, the indication may be an indication by the SeNB 225 that a CQI value of the SeNB-UE radio link 235 was identified by the SeNB 225 as being below a channel quality threshold. In some embodiments, the indication may be an indication that the UE 205 identified the channel quality of the SeNB-UE radio link 235 as poor, as will be described in greater detail below. For example, the indication may be related to one or more RACH processes initiated by the UE 205. In some embodiments, the indication may be one or more CQI values reported by the UE 205 and/or the SeNB 225, and may include shared DL CQI values as described above.

The MeNB 215 may then identify at 405 that the channel quality of the SeNB-UE radio link 235 is below a channel quality threshold. In embodiments, this identification may be performed on the basis of a notification by the SeNB 225 that the SeNB 225 or the UE 205 already identified that the channel quality of the SeNB-UE radio link 235 was poor. In some embodiments, the identification may be based on a comparison by the MeNB 215 of the received CQI values or shared DL CQI values with a channel quality threshold.

Based on the identification that the SeNB-UE radio link 235 is poor, the MeNB may transmit at 410 an RRC command to the UE via the MeNB-UE radio link 230. The RRC command may be, for example, a handover command instructing the UE 205 to either decouple from the SeNB 225, change one or more parameter of the SeNB-UE radio link 235, couple with another eNB (not shown), or some other command. In some embodiments, the MeNB 215 may transmit a similar RRC command to the SeNB 225.

In some embodiments, the UE 205, and particularly the RRC circuitry 210 of the UE 205, may be configured to identify that the quality of the SeNB-UE radio link 235 is poor. As described below, the processes and link analysis may be described as being performed by the UE 205 for the sake of simplicity; however in embodiments the various processes and analysis may be performed by the RRC circuitry 210 or some other processor, circuitry, or module of the UE 205.

In embodiments, the UE 205 may monitor the SeNB-UE radio link 235 in a manner similar to how the UE 205 may monitor the MeNB-UE radio link 230. For example, the UE 205 may use one or more RLM parameters to monitor the SeNB-UE radio link 235. In some embodiments, the RLM parameters may be different than the RLM parameters with which the UE 205 may monitor the MeNB-UE radio link 230. Additionally, the UE 205 may use one or more timers to monitor the SeNB-UE radio link 235, which may be different than timers that may be used to monitor the MeNB-UE radio link 230.

For example, in some embodiments new timers may be used by the UE 205 to monitor the channel quality of the SeNB-UE radio link 235. In some embodiments, the timers may be named "T310d" and "T311 d," and be based on constants "N310d" and "N311d," though in other embodiments the timers and/or constants may have different names. In some embodiments, parameters or values related to the timers and/or constants may be signaled by the MeNB 215 in a SystemInformationBlockType2 (SIB2) message.

In some embodiments, the UE 205 may periodically measure one or more CQI parameters of the SeNB-UE radio link 235. If the average CQI of the SeNB-UE radio link 235 falls below a certain threshold, which may be referred to as Qouts, the UE 205 may generate an indication that the channel quality of the SeNB-UE radio link 235 is poor. In some embodiments, the indication may be an indication that the UE 205 is not synchronized with the SeNB 225. If the UE 205 generates a certain number of indications, which may be related to or equal to the constant N310d, then the UE 205 may start a timer which may be or be related to timer T310d.

Then, if the wideband CQI value of the SeNB-UE radio link 235, or an average of the wideband CQI value over a time period such as 100 milliseconds (ms) or some other time period, goes above another threshold, which may be referred to as Qins, then an indication that the channel quality of the SeNB-UE radio link 235 is sufficient may be generated. If the UE 205 generates a certain number of indications that the channel quality of the SeNB-UE radio link 235 is sufficient, which may be related to or equal to the constant N311d, then the timer T310d may be stopped and the radio link may be considered recovered. Otherwise, when the timer T310d expires, a second timer such as timer T311d and one or more RACH processes may be initiated. The RACH processes may include, for example, transmitting a handover request to the SeNB 225 to forward to the MeNB. In some embodiments, the UE 205 may transmit an indication of poor channel quality of the SeNB-UE radio link 235 to the SeNB 225 to forward to the MeNB 215, and the MeNB 215 may initiate a handover procedure or some other procedure to change a parameter of the SeNB-UE radio link 235 as described above.

In some embodiments timer T310d may have values such as 0 ms, 50 ms, 100 ms, 200 ms, 500 ms, 1000 ms, 2000 ms, or some other value. In some embodiments constant N310d may have values such as 1, 2, 3, 4, 6, 8, 10, 20, or some other value. In some embodiments, timer T311d may have values such as 1000 ms, 3000 ms, 5000 ms, 10000 ms, 15000 ms, 20000 ms, 30000 ms, or some other value. In some embodiments, constant N311d may have values such as 1, 2, 3, 4, 5, 6, 8, 10, or some other value. These timers may be specified in an information element (IE) of the SIB2 that may be referred to as "UE-d-TimersAndConstants" or some other name.

As noted above, in some embodiments the coverage of the SeNB 225 and the MeNB 215 may be different, and therefore the RLM parameters related to the SeNB-UE radio link 235 such as the timers T310d or T311d or the constants N310d or N311d may be different than RLM parameters related to the MeNB-UE radio link 230. For example, a UE 205 may need to be able to move from one small cell to another in macro coverage. In this scenario, having shorter values for timers T310d and/or T311d may help the UE 205 to communicatively connect with the second small cell more quickly, which may result in an increase in overall throughput.

Figure 5:
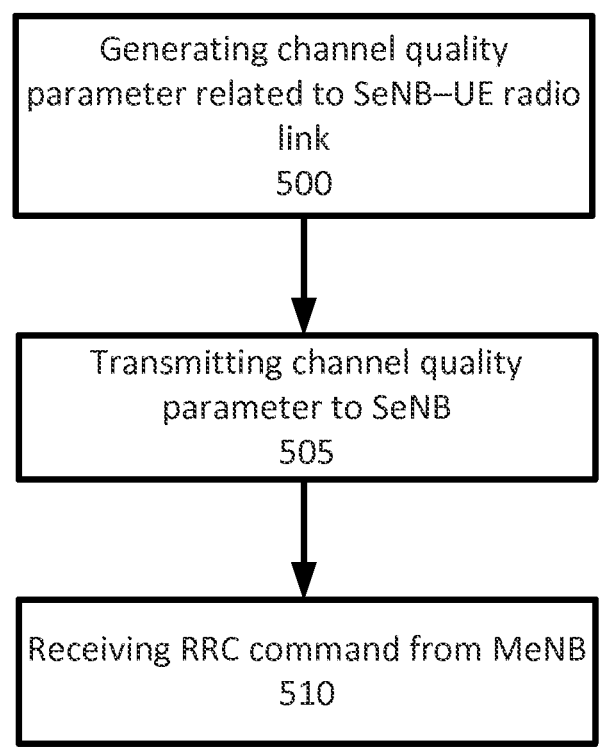
FIG. 5 depicts a process for monitoring the SeNB-UE radio link that may be performed by a UE, in accordance with various embodiments.

FIG. 5 depicts a process that may be used by the UE 205 to monitor the channel quality of the SeNB-UE radio link 235. Initially, the UE 205 (or the RRC circuitry 210 of the UE 205) may generate a channel quality parameter related to the SeNB-UE radio link 235 at 500. As noted above, the channel quality parameter may be an indication by the UE 205 that the channel quality of the SeNB-UE radio link 235 is poor, and may be based on one or more of the RLM parameters discussed above. In other embodiments, the channel quality parameter may be related to measurements of CQI values of the SeNB-UE radio link 235. In some embodiments, the channel quality parameter may be related to a RACH process and may be, for example, a handover request or some other parameter related to channel quality of the SeNB-UE radio link 235.

The UE 205 may then transmit the channel quality parameter to the SeNB 225 at 505. The SeNB 225 may then pass the channel quality parameter, or an indication of the channel quality parameter, to the MeNB 215 which may in turn generate an RRC command that is transmitted to the UE 205. The UE 205 may therefore receive the RRC command from the MeNB 215 at 510 over the MeNB-UE radio link 230. The RRC command may be related to a handover process or some other process to change a parameter of the SeNB-UE radio link 235.

Figure 6:
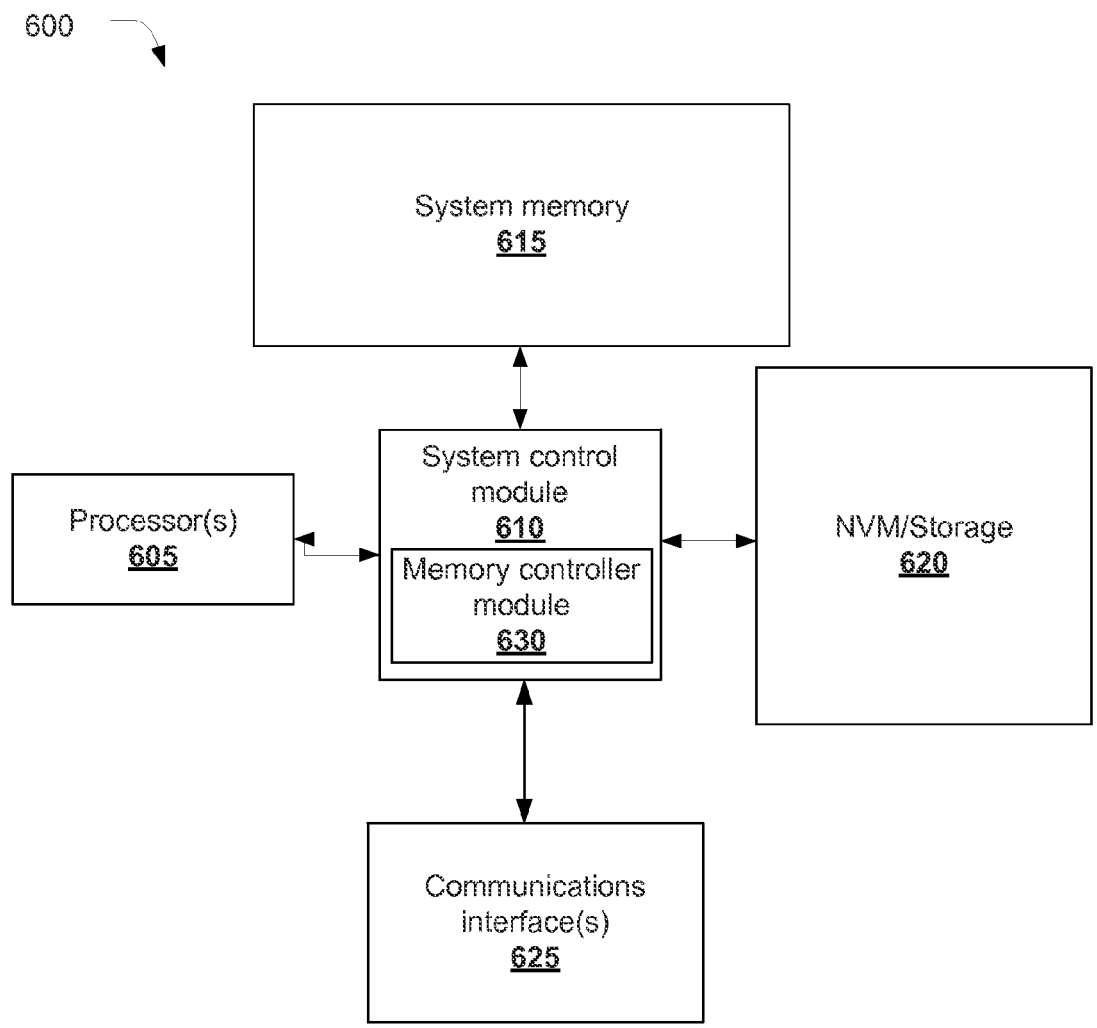
FIG. 6 schematically illustrates an example system that may be used to practice various embodiments described herein.

Embodiments of the present disclosure may be implemented into a system using any suitable hardware and/or software to configure as desired. FIG. 6 schematically illustrates an example system 600 that may be used to practice various embodiments described herein. FIG. 6 illustrates, for one embodiment, an example system 600 having one or more processor(s) 605, system control module 610 coupled to at least one of the processor(s) 605, system memory 615 coupled to system control module 610, non-volatile memory (NVM)/storage 620 coupled to system control module 610, and one or more communications interface(s) 625 coupled to system control module 610.

In some embodiments, the system 600 may be capable of functioning as the UE 110 or 205 as described herein. In other embodiments, the system 600 may be capable of functioning as eNB 105, SeNB 225, and/or MeNB 215 as described herein. In some embodiments, the system 600 may include one or more computer-readable media (e.g., system memory or NVM/storage 620) having instructions and one or more processors (e.g., processor(s) 605) coupled with the one or more computer-readable media and configured to execute the instructions to implement a module to perform actions described herein.

System control module 610 for one embodiment may include any suitable interface controllers to provide for any suitable interface to at least one of the processor(s) 605 and/or to any suitable device or component in communication with system control module 610.

System control module 610 may include memory controller module 630 to provide an interface to system memory 615. The memory controller module 630 may be a hardware module, a software module, and/or a firmware module.

System memory 615 may be used to load and store data and/or instructions, for example, for system 600. System memory 615 for one embodiment may include any suitable volatile memory, such as suitable DRAM, for example. In some embodiments, the system memory 615 may include double data rate type four synchronous dynamic random-access memory (DDR4 SDRAM).

System control module 610 for one embodiment may include one or more input/output (I/O) controller(s) to provide an interface to NVM/storage 620 and communications interface(s) 625.

The NVM/storage 620 may be used to store data and/or instructions, for example. NVM/storage 620 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example. In some embodiments, NVM/storage 620 may be coupled with the communication module 137, and the communication module 137 may be configured to store data such as a received selection preference rule or indications of channel quality in the NVM/storage 620.

The NVM/storage 620 may include a storage resource physically part of a device on which the system 600 may be installed or it may be accessible by, but not necessarily a part of, the device. For example, the NVM/storage 620 may be accessed over a network via the communications interface(s) 625.

Communications interface(s) 625 may provide an interface for system 600 to communicate over one or more network(s) and/or with any other suitable device. The system 600 may wirelessly communicate with the one or more components of the wireless network in accordance with any of one or more wireless network standards and/or protocols. In some embodiments the communications interface(s) 625 may include the transceiver modules 130 or 150.

For one embodiment, at least one of the processor(s) 605 may be packaged together with logic for one or more controller(s) of system control module 610, e.g., memory controller module 630. For one embodiment, at least one of the processor(s) 605 may be packaged together with logic for one or more controllers of system control module 610 to form a System in Package (SiP). For one embodiment, at least one of the processor(s) 605 may be integrated on the same die with logic for one or more controller(s) of system control module 610. For one embodiment, at least one of the processor(s) 605 may be integrated on the same die with logic for one or more controller(s) of system control module 610 to form a System on Chip (SoC).

In some embodiments the processor(s) 605 may include or otherwise be coupled with one or more of a graphics processor (GPU) (not shown), a digital signal processor (DSP) (not shown), wireless modem (not shown), digital camera or multimedia circuitry (not shown), sensor circuitry (not shown), display circuitry (not shown), and/or global positioning satellite (GPS) circuitry (not shown).

In various embodiments, the system 600 may be, but is not limited to, a server, a workstation, a desktop computing device, or a mobile computing device (e.g., a laptop computing device, a handheld computing device, a tablet, a netbook, a smartphone, a gaming console, etc.). In various embodiments, the system 600 may have more or fewer components, and/or different architectures. For example, in some embodiments, the system 600 includes one or more of a camera, a keyboard, liquid crystal display (LCD) screen (including touch screen displays), non-volatile memory port, multiple antennas, graphics chip, application-specific integrated circuit (ASIC), and speakers.

EXAMPLES

Example 1 may include a user equipment (UE) comprising: radio resource control (RRC) circuitry to generate an indication of a channel quality parameter related to a first radio link between the UE and a secondary evolved NodeB (SeNB) with which the UE is communicatively coupled via the first radio link; and transmit circuitry coupled with the RRC circuitry, the transmit circuitry to transmit a message to the SeNB, wherein the message is intended for a master eNB (MeNB) with which the UE is communicatively coupled via a second radio link between the UE and the MeNB concurrently with the first radio link, and the message includes the indication of the channel quality parameter.

Example 2 may include the UE of example 1, wherein the SeNB has a first cell coverage area and the MeNB has a second cell coverage area that is at least partially different than the first cell coverage area.

Example 3 may include the UE of example 1, wherein the indication is based on a radio link monitoring (RLM) parameter that is related to the first radio link and is different than an RLM parameter related to the second radio link.

Example 4 may include the UE of example 1, wherein the indication is based on a timer that related to the first radio link and is different than a timer related to the second radio link.

Example 5 may include the UE of any of examples 1-4, further comprising receive circuitry coupled with the RRC circuitry, the receive circuitry to receive, from the second eNB over the second radio link, an RRC message based on the indication of the channel quality parameter.

Example 6 may include the UE of any of examples 1-4, further comprising a non-volatile memory (NVM) coupled with the RRC circuitry.

Example 7 may include a method comprising: receiving, by a secondary evolved NodeB (SeNB) from a user equipment (UE) that is communicatively coupled with the SeNB via a first radio link, a parameter related to a quality of the first radio link; and transmitting, by the SeNB, an indication of the parameter to a master eNB (MeNB) that is communicatively coupled with the UE via a second radio link concurrently with the first radio link.

Example 8 may include the method of example 7, wherein the SeNB has a first cell coverage area and the MeNB has a second cell coverage area that is at least partially different than the first cell coverage area.

Example 9 may include the method of examples 7 or 8, wherein the parameter is based on a first timer that is related to the first radio link and is different than a second timer that is related to the second radio link.

Example 10 may include the method of examples 7 or 8, wherein the parameter is based on a first radio link monitoring (RLM) parameter that is related to the first radio link and is different than a second RLM parameter that is related to the second radio link.

Example 11 may include the method of examples 7 or 8, wherein the parameter is a channel quality indicator (CQI) value measured by the UE.

Example 12 may include the method of example 11, wherein the indication is based on comparing, by the SeNB, a channel quality indicator (CQI) value measured by the UE to a channel quality threshold.

Example 13 may include the method of example 11, wherein the indication is the CQI value measured by the UE.

Example 14 may include an evolved NodeB (eNB) comprising: receive circuitry to receive, from a remote eNB, an indication of a channel quality parameter related to a first radio link between the remote eNB and a user equipment (UE) that are communicatively coupled via the first radio link when the UE is also communicatively coupled with the eNB via a second radio link; and radio resource control (RRC) circuitry coupled with the receive circuitry, the control circuitry to identify, based on the indication, that channel quality of the first radio link is below a channel quality threshold.

Example 15 may include the eNB of example 14, further comprising transmit circuitry coupled with the RRC circuitry, the transmit circuitry to transmit a handover command to the UE via the second radio link if the channel quality of the first radio link is below the channel quality threshold.

Example 16 may include the eNB of examples 14 or 15, wherein the eNB is a master eNB (MeNB) and the remote eNB is a secondary eNB (SeNB).

Example 17 may include the eNB of example 16, wherein the SeNB has a first cell coverage area and the MeNB has a second cell coverage area that is at least partially different than the first cell coverage area.

Example 18 may include the eNB of examples 14 or 15, wherein the channel quality parameter is based on a first timer that is related to the first radio link and is different than a second timer that is related to the second radio link, or the channel quality parameter is based on a first radio link monitoring (RLM) parameter that is related to the first radio link and is different than a second RLM parameter that is related to the second radio link.

Example 19 may include the eNB of examples 14 or 15, wherein the channel quality parameter is a channel quality indicator (CQI) value measured by the UE and the channel quality threshold is a channel quality threshold of the eNB.

Example 20 may include the eNB of examples 14 or 15, wherein the channel quality threshold is a channel quality threshold of the remote eNB and the indication is based on a comparison, by the remote eNB, of a channel quality indicator (CQI) value measured by the UE to the channel quality threshold.

Example 21 may include a secondary evolved NodeB (SeNB) comprising: means to receive, from a user equipment (UE) that is communicatively coupled with the SeNB via a first radio link, a parameter related to a quality of the first radio link; and means to transmit an indication of the parameter to a master eNB (MeNB) that is communicatively coupled with the UE via a second radio link concurrently with the first radio link.

Example 22 may include the SeNB of example 21, wherein the SeNB has a first cell coverage area and the MeNB has a second cell coverage area that is at least partially different than the first cell coverage area.

Example 23 may include the SeNB of examples 21 or 22, wherein the parameter is based on a first timer that is related to the first radio link and is different than a second timer that is related to the second radio link.

Example 24 may include the SeNB of examples 21 or 22, wherein the parameter is based on a first radio link monitoring (RLM) parameter that is related to the first radio link and is different than a second RLM parameter that is related to the second radio link.

Example 25 may include the SeNB of examples 21 or 22, wherein the parameter is a channel quality indicator (CQI) value measured by the UE.

Example 26 may include the SeNB of example 25, wherein the indication is based on a comparison of a channel quality indicator (CQI) value measured by the UE to a channel quality threshold.

Example 27 may include the SeNB of example 25, wherein the indication is the CQI value measured by the UE.

Example 28 may include one or more non-transitory computer-readable media comprising instructions to cause a secondary evolved NodeB (SeNB), upon execution of the instructions by one or more processors of the SeNB, to: receive, from a user equipment (UE) that is communicatively coupled with the SeNB via a first radio link, a parameter related to a quality of the first radio link; and transmit an indication of the parameter to a master eNB (MeNB) that is communicatively coupled with the UE via a second radio link concurrently with the first radio link.

Example 29 may include the one or more non-transitory computer-readable media of example 28, wherein the SeNB has a first cell coverage area and the MeNB has a second cell coverage area that is at least partially different than the first cell coverage area.

Example 30 may include the one or more non-transitory computer-readable media of examples 28 or 29, wherein the parameter is based on a first timer that is related to the first radio link and is different than a second timer that is related to the second radio link.

Example 31 may include the one or more non-transitory computer-readable media of examples 28 or 29, wherein the parameter is based on a first radio link monitoring (RLM) parameter that is related to the first radio link and is different than a second RLM parameter that is related to the second radio link.

Example 32 may include the one or more non-transitory computer-readable media of example 28 or 29, wherein the parameter is a channel quality indicator (CQI) value measured by the UE.

Example 33 may include the one or more non-transitory computer-readable media of example 32, wherein the indication is based on a comparison of a channel quality indicator (CQI) value measured by the UE to a channel quality threshold.

Example 34 may include the one or more non-transitory computer-readable media of example 32, wherein the indication is the CQI value measured by the UE.

Example 35 may include a method comprising: receiving, by a master evolved NodeB (MeNB) from a secondary evolved NodeB (SeNB), an indication of a channel quality parameter related to a first radio link between the SeNB and a user equipment (UE) that are communicatively coupled via the first radio link when the UE is also communicatively coupled with the MeNB via a second radio link; and identifying, by the MeNB based on the indication, that channel quality of the first radio link is below a channel quality threshold.

Example 36 may include the method of example 35, further comprising transmitting, by the MeNB, a handover command to the UE via the second radio link if the channel quality of the first radio link is below the channel quality threshold.

Example 37 may include the method of examples 35 or 36, wherein the SeNB has a first cell coverage area and the MeNB has a second cell coverage area that is at least partially different than the first cell coverage area.

Example 38 may include the method of examples 35 or 36, wherein the channel quality parameter is based on a first timer that is related to the first radio link and is different than a second timer that is related to the second radio link, or the channel quality parameter is based on a first radio link monitoring (RLM) parameter that is related to the first radio link and is different than a second RLM parameter that is related to the second radio link.

Example 39 may include the method of examples 35 or 36, wherein the channel quality parameter is a channel quality indicator (CQI) value measured by the UE and the channel quality threshold is a channel quality threshold of the MeNB.

Example 40 may include the method of examples 35 or 36, wherein the channel quality threshold is a channel quality threshold of the SeNB and the indication is based on a comparison, by the SeNB, of a channel quality indicator (CQI) value measured by the UE to the channel quality threshold.

Example 41 may include a master evolved NodeB (MeNB) comprising: means to receive, from a secondary evolved NodeB (SeNB), an indication of a channel quality parameter related to a first radio link between the SeNB and a user equipment (UE) that are communicatively coupled via the first radio link when the UE is also communicatively coupled with the MeNB via a second radio link; and means to identify, based on the indication, that channel quality of the first radio link is below a channel quality threshold.

Example 42 may include the MeNB of example 41, further comprising means to transmit a handover command to the UE via the second radio link if the channel quality of the first radio link is below the channel quality threshold.

Example 43 may include the MeNB of examples 41 or 42, wherein the SeNB has a first cell coverage area and the MeNB has a second cell coverage area that is at least partially different than the first cell coverage area.

Example 44 may include the MeNB of examples 41 or 42, wherein the channel quality parameter is based on a first timer that is related to the first radio link and is different than a second timer that is related to the second radio link, or the channel quality parameter is based on a first radio link monitoring (RLM) parameter that is related to the first radio link and is different than a second RLM parameter that is related to the second radio link.

Example 45 may include the MeNB of examples 41 or 42, wherein the channel quality parameter is a channel quality indicator (CQI) value measured by the UE and the channel quality threshold is a channel quality threshold of the MeNB.

Example 46 may include the MeNB of examples 41 or 42, wherein the channel quality threshold is a channel quality threshold of the SeNB and the indication is based on a comparison, by the SeNB, of a channel quality indicator (CQI) value measured by the UE to the channel quality threshold.

Example 47 may include one or more non-transitory computer-readable media comprising instructions to cause a master evolved NodeB (MeNB), upon execution of the instructions by one or more processors of the MeNB, to: receive, from a secondary evolved NodeB (SeNB), an indication of a channel quality parameter related to a first radio link between the SeNB and a user equipment (UE) that are communicatively coupled via the first radio link when the UE is also communicatively coupled with the MeNB via a second radio link; and identify, based on the indication, that channel quality of the first radio link is below a channel quality threshold.

Example 48 may include the one or more non-transitory computer-readable media of example 47, further comprising instructions to transmit a handover command to the UE via the second radio link if the channel quality of the first radio link is below the channel quality threshold.

Example 49 may include the one or more non-transitory computer-readable media of examples 47 or 48, wherein the SeNB has a first cell coverage area and the MeNB has a second cell coverage area that is at least partially different than the first cell coverage area.

Example 50 may include the one or more non-transitory computer-readable media of examples 47 or 48, wherein the channel quality parameter is based on a first timer that is related to the first radio link and is different than a second timer that is related to the second radio link, or the channel quality parameter is based on a first radio link monitoring (RLM) parameter that is related to the first radio link and is different than a second RLM parameter that is related to the second radio link.

Example 51 may include the one or more non-transitory computer-readable media of examples 47 or 48, wherein the channel quality parameter is a channel quality indicator (CQI) value measured by the UE and the channel quality threshold is a channel quality threshold of the MeNB.

Example 52 may include the one or more non-transitory computer-readable media of examples 47 or 48, wherein the channel quality threshold is a channel quality threshold of the SeNB and the indication is based on a comparison, by the SeNB, of a channel quality indicator (CQI) value measured by the UE to the channel quality threshold.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A user equipment (UE) comprising:
    a communications interface to:
        process a first downlink (DL) signal from a secondary evolved NodeB (SeNB) that the UE is to communicatively couple with over a first radio link; and
        process a second DL signal from a master evolved NodeB (MeNB) that the UE is to communicatively couple with over a second radio link, wherein the first radio link and the second radio link are radio links that at least partially overlap in time in a dual connectivity network; and
    radio resource control (RRC) circuitry coupled with the communications interface, the RRC circuitry to generate, based on a first radio link monitoring (RLM) parameter that is related to the first radio link and the first DL signal and that is different than a second RLM parameter that is related to the second radio link and the second DL signal, a first indication of a quality parameter related to the first radio link;
    wherein the first RLM parameter is a value of a first timer that is related to the first radio link and the second RLM parameter is a value of a second timer that is related to the second radio link and the first timer is different from the second timer; and
    wherein the second timer is a t310 timer and the first timer is a timer that is different than the t310 timer.

2. The UE of claim 1, wherein the SeNB has a first cell coverage area and the MeNB has a second cell coverage area that is at least partially different than the first cell coverage area.

3. The UE of claim 1, wherein the communications interface is further to transmit the first indication to the SeNB.

4. The UE of claim 3, wherein the indication is to be transmitted by the SeNB to the MeNB.

5. The UE of claim 3, wherein the communications interface is further to receive, from the MeNB over the second radio link, a RRC message based on the first indication.

6. The UE of claim 1, wherein the quality parameter related to the first radio link is a channel quality indicator (CQI) parameter.

7. The UE of claim 1, further comprising a non-volatile memory (NVM) coupled with the RRC circuitry.

8. One or more non-transitory computer-readable media comprising instructions to cause a user equipment (UE) that is concurrently communicatively coupled with a secondary evolved NodeB (SeNB) over a first radio link and a master evolved NodeB (MeNB) over a second radio link in a dual connectivity network such that the first radio link and the second radio link at least partially overlap in time, upon execution of the instructions by one or more processors of the UE, to:
    identify a first downlink (DL) signal from the SeNB and a second DL signal from the MeNB; and
    generate, based on a first radio link monitoring (RLM) parameter that is related to the first radio link and the first DL signal and that is different than a second RLM parameter that is related to the second radio link and the second DL signal, an indication of a quality parameter related to the first radio link;
    wherein the first RLM parameter is a value of a first timer that is related to the first radio link and the second RLM parameter is a value of a T310 timer that is related to the second radio link, and the first timer is different than a T310 timer.

9. The one or more non-transitory computer-readable media of claim 8, wherein the SeNB has a first cell coverage area and the MeNB has a second cell coverage area that is at least partially different than the first cell coverage area.

10. The one or more non-transitory computer-readable media of claim 8, wherein the instructions are further to transmit the indication to the SeNB.

11. The one or more non-transitory computer-readable media of claim 10, wherein the indication is to be transmitted by the SeNB to the MeNB.

12. The one or more non-transitory computer-readable media of claim 10, wherein the instructions are further to receive, from the MeNB, a radio resource control (RRC) message based on the indication.

13. The one or more non-transitory computer-readable media of claim 8, wherein the quality parameter related to the first radio link is a channel quality indicator (CQI) parameter.

14. User equipment (UE) circuitry to:
process a first downlink (DL) signal from a secondary evolved NodeB (SeNB) that the UE is to communicatively couple with over a first radio link;
process a second DL signal from a master evolved NodeB (MeNB) that the UE is to communicatively couple with over a second radio link, wherein the first radio link and the second radio link are radio links that at least partially overlap in time in a dual connectivity network; and
generate, based on a first radio link monitoring (RLM) parameter that is related to the first radio link and the first DL signal and that is different than a second RLM parameter that is related to the second radio link and the second DL signal, a first indication of a quality parameter related to the first radio link;
wherein the first RLM parameter is a value of a first timer that is related to the first radio link and the second RLM parameter is a value of a T310 timer that is related to the second radio link, and the first timer is different than a T310 timer.

15. The UE circuitry of claim 14, wherein the SeNB has a first cell coverage area and the MeNB has a second cell coverage area that is at least partially different than the first cell coverage area.

16. The UE circuitry of claim 14, wherein the UE circuitry is further to transmit the first indication to the SeNB.

17. The UE circuitry of claim 16, wherein the indication is to be transmitted by the SeNB to the MeNB.

18. The UE circuitry of claim 16, wherein the UE circuitry is further to receive, from the MeNB over the second radio link, a RRC message based on the first indication.

19. The UE circuitry of claim 14, wherein the quality parameter related to the first radio link is a channel quality indicator (CQI) parameter.

* * * * *